United States Patent [19]

Fujimoto

[11] Patent Number: 5,159,461
[45] Date of Patent: Oct. 27, 1992

[54] IMAGE SIGNAL RECORDING APPARATUS

[75] Inventor: Ryo Fujimoto, Kanagawa, Japan

[73] Assignee: Canon Kabushiki Kaisha, Tokyo, Japan

[21] Appl. No.: 344,202

[22] Filed: Apr. 27, 1989

[30] Foreign Application Priority Data

May 6, 1988 [JP] Japan .................. 63-111334

[51] Int. Cl.$^5$ ............................. H04N 9/79
[52] U.S. Cl. .................... 358/310; 358/909; 358/906
[58] Field of Search ............... 358/906, 909, 310, 50, 358/41, 48, 334; 360/33.1, 35.1

[56] References Cited

U.S. PATENT DOCUMENTS

| | | | |
|---|---|---|---|
| 3,394,219 | 7/1968 | Paehr | 358/50 |
| 3,666,882 | 5/1972 | Nishimura | 358/50 |
| 4,166,280 | 8/1979 | Poole | 358/50 |
| 4,322,740 | 3/1982 | Takemoto et al. | 358/50 |
| 4,858,025 | 8/1989 | Tabei | 358/310 |
| 4,862,292 | 8/1989 | Enari et al. | 360/8 |

FOREIGN PATENT DOCUMENTS 2119199A 11/1983 United Kingdom ............ 358/334

OTHER PUBLICATIONS

Aizawa et al., *High Resolution electronic still camera with two MOS imagers*, Dec. 1985, pp. 425-429.

Tanaka et al., *An electronic still camera system*, Dec. 1986, pp. 345-354.

NEC Research & Development—No. 56, Jan 80, pp. 144-147 (incomplete).

*Primary Examiner*—Donald McElheny, Jr.
*Assistant Examiner*—Thai Tran
*Attorney, Agent, or Firm*—Robin, Blecker, Daley & Driscoll

[57] ABSTRACT

An image signal recording apparatus is provided for recording on a recording medium an image signal obtained by imaging an object. The apparatus is arranged to sense the object, to generate first and second sensed image signals containing signal components which are the same in kind, and a third second image signal containing signal components which differ in kinds from the signal components of the first and second sensed image signals, to form a first recording image signal for one frame, which includes a luminance signal and a color-difference line-sequential signal in which two kinds of color-difference signals are alternated in every one horizontal scanning period, by using the first and third sensed image signal, and to form a second recording image signal for one frame, which includes a luminance signal and a color-difference line-sequential signal in which color-difference signals are alternated with a rotation which at least partially differs from the rotation of the color-difference signals contained in said first recording signal, by using the second sensed image signal and th ethird sensed image signal, and to record the thus-formed first recording image signal and the thus-formed second recording image signal on different areas of the recording medium, respectively.

12 Claims, 7 Drawing Sheets

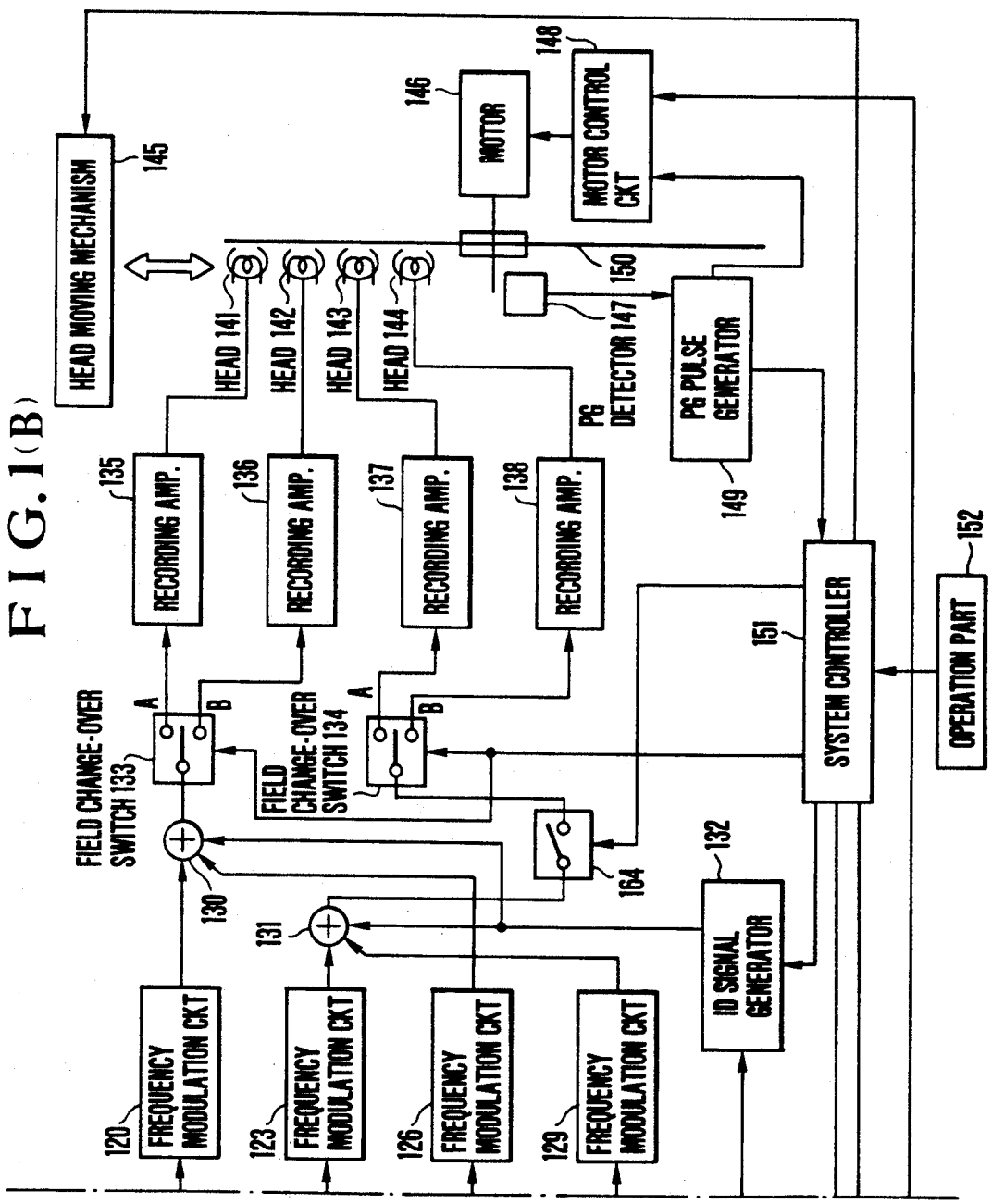

G SIGNAL (Y SIGNAL)

R SIGNAL (R-Y SIGNAL)

B SIGNAL (B-Y SIGNAL)

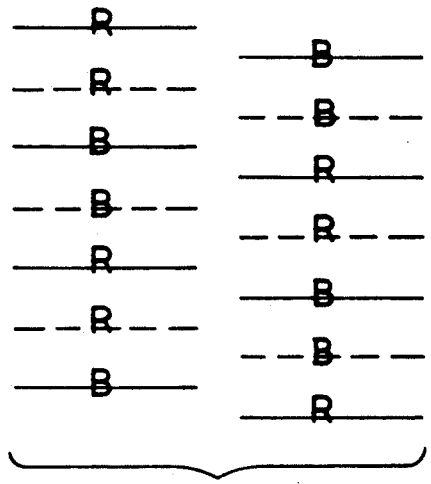
F I G. 4 (A)
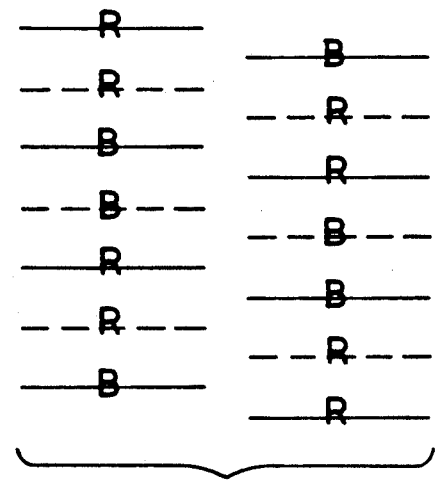
F I G. 4 (B)
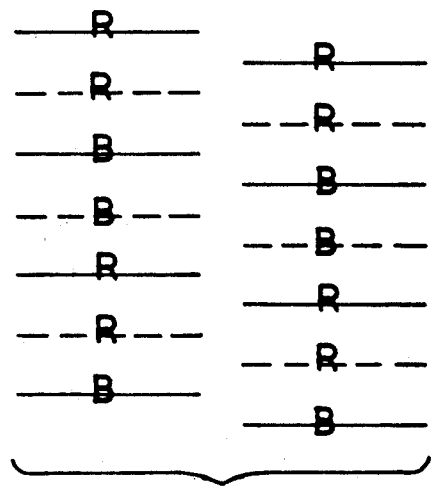
F I G. 4 (C)
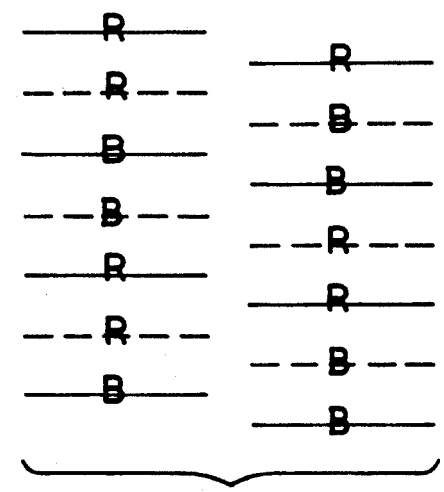
F I G. 4 (D)

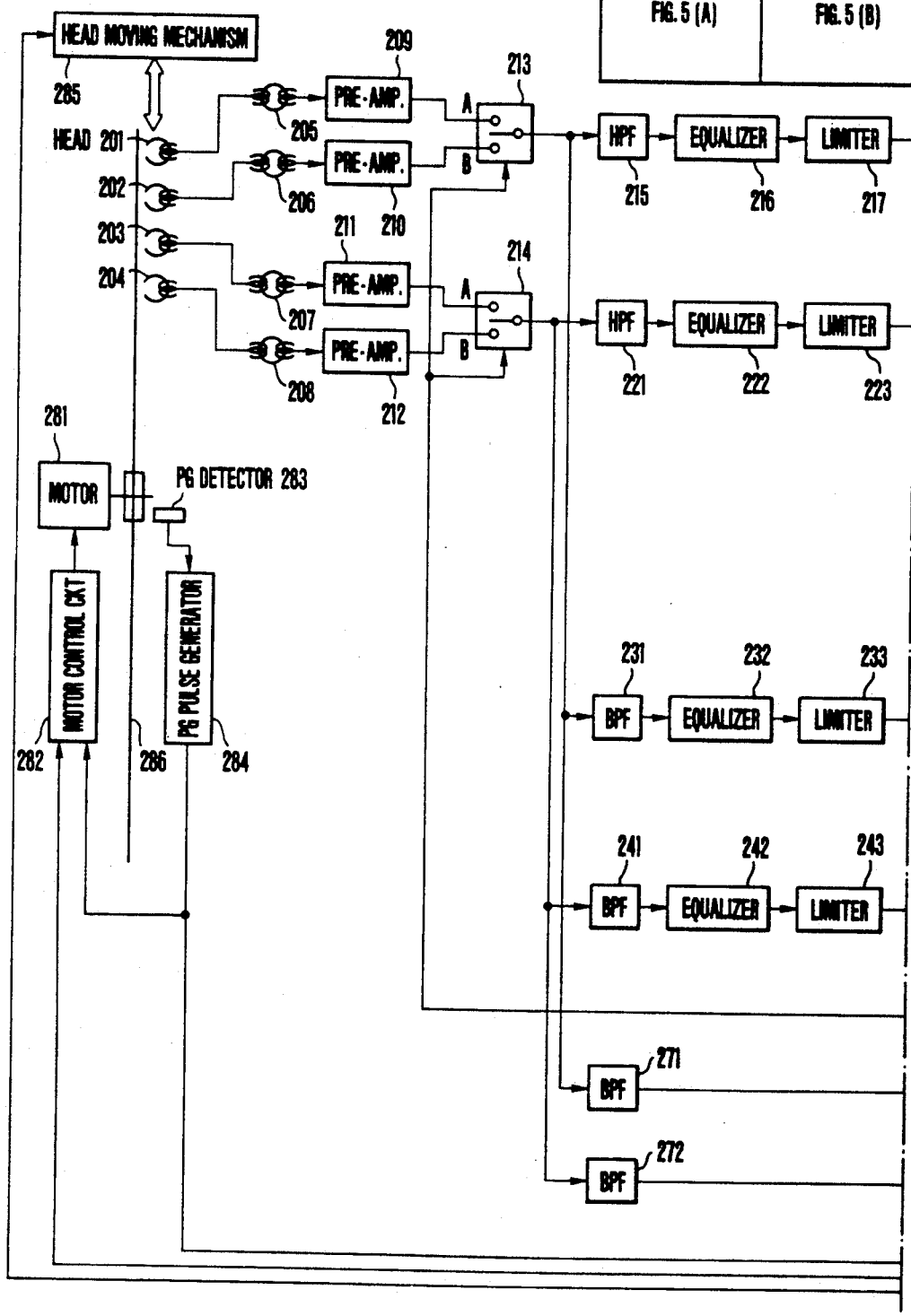

IMAGE SIGNAL RECORDING APPARATUS

BACKGROUND OF THE INVENTION

1. Field of the Invention

The present invention relates to an image signal recording apparatus for recording on a recording medium an image signal obtained by imaging an object.

2. Description of the Related Art

Electronic still video cameras have heretofore been known as recording/reproducing apparatus for recording a video signal obtained through image sensing means such as a video camera on a recording medium such as a magnetic disc and for reproducing the video signal recorded on the recording medium.

Currently known types of electronic still video cameras, however, can only record or reproduce a television signal which, at best, conforms to current television systems (for example, the NTSC system). Accordingly, in the case of a format which complies with the NTSC system, the number of scanning lines is 525 lines per frame with a horizontal resolution of 350 TV lines.

In such a situation, with the recent improvement in the quality of images handled by video tape recorders, it has been strongly desired to improve the quality of images processed by electronic still video cameras.

However, the degree of resolution adopted by the current to effect recording and reproduction of still images of satisfactory quality. Moreover, even if a video signal reproduced from a magnetic disc is printed in the form of a still image, the resultant image is an image whose quality is far lower than the quality of an image obtained by a conventional camera such as a silver-halide type camera.

A novel television system of increased quality such as a high-definition television system has recently been proposed, and various experiments on such novel television system have been conducted. When electronic still video cameras which comply with the new television system are to be designed, designers will encounter the problem that it is very difficult to realize satisfactory recording and reproduction using the current format. Moreover, if a new format is adopted in accordance with the new television system, it will be difficult to maintain compatibility with the conventional format. Also, the conventional format has the disadvantage that the band of a signal allocated for a chromatic signal is absolutely narrow.

SUMMARY OF THE INVENTION

It is, therefore, an object of the present invention to provide an image signal recording apparatus capable of overcoming the above-described problems.

It is another object of the present invention to provide an image signal recording apparatus having compatibility with a conventional format and yet being capable of recording on a recording medium an image signal in which not only the quality of its luminance component but also the quality of its chrominance component is improved compared to the quality of the luminance and chrominance components of an image signal recorded by a conventional apparatus.

To achieve the above objects, in accordance with one aspect of the present invention, there is provided an image signal recording apparatus for recording on a recording medium an image signal obtained by imaging an object. This apparatus is provided with first image sensing means for generating a first sensed image signal by imaging the object; second image sensing means arranged to image the object and generate a second sensed image signal containing signal components which are the same in kind as signal components of the first sensed image signal, the arrangement of picture elements of the second image sensing means differing from the arrangement of picture elements of the first image sensing means in relation to the object; third image sensing means arranged to image the object and generate a third sensed image signal containing signal components which differ in kind from the signal components of the first and second sensed image signals; recording image signal forming means for forming a first recording image signal for one frame, which is composed of a luminance signal and a color-difference line-sequential signal, by using the first sensed image signal and the third sensed image signal and for forming a second recording image signal for one frame, which is composed of a luminance signal and a color-difference line-sequential signal, by using the second sensed image signal and the third sensed image signal, the recording image signal forming means being arranged to form the first and second recording image signals such that the rotation of a color-difference signal in the color-difference line-sequential signal contained in at least a part of the first recording image signal differs from the rotation of a color-difference signal in the color-difference line sequential signal contained in a part of the second recording image signal which corresponds to the part of the first recording image signal; and recording means for recording the first recording image signal for one frame formed by the recording image signal forming means and the second recording image signal for one frame formed by the recording image signal forming means in different regions on the recording medium, respectively.

It is still another object of the present invention to provide an image signal recording apparatus capable of recording, selectively and with the smallest possible deterioration in the chrominance component, an image signal based on a conventional format and an image signal based on a format corresponding to an image whose quality is higher than the image quality provided by the conventional format.

To achieve the above object, in accordance with another aspect of the present invention, there is provided an image signal recording apparatus for recording on a recording medium an image signal obtained by imaging an object. This apparatus is provided with first image sensing means having a first image sensing part and a second image sensing part having picture elements whose arrangement differs from the arrangement of picture elements of the first image sensing part in relation to the object, the first image sensing means being arranged to generate a first sensed image signal by imaging the object through the first image sensing part and a second sensed image signal having signal components which are the same in kind as signal components of the first sensed image signal by imaging the object through the second image sensing part; second image sensing means arranged to image the object and generate a third sensed image signal having signal components which differ in kind from the signal components of the first and second sensed image signals; recording image signal forming means for forming a first recording image signal for one frame, which is composed of a luminance signal and a color-difference line-sequential signal, by using the first sensed image signal and the third sensed image signal and for forming a second recording image signal for one frame, which is composed of a luminance signal and a color-difference line-sequential signal, by using the second sensed image signal and the third sensed image signal, the recording image signal forming means being arranged to form the first and second recording image signals such that the rotation of a color-difference signal in the color-difference line-sequential signal contained in at least a part of the first recording image signal differs from the rotation of a color-difference signal in the color-difference line-sequential signal contained in a part of the second recording image signal which corresponds to the part of the first recording image signal; and recording means having a first recording mode and a second recording mode and arranged to record, in the first recording mode, the first recording image signal for one frame formed by the recording image signal forming means and the second recording image signal for one frame formed by the recording image signal forming means in different regions on the recording medium, respectively, and, in the second recording mode, to record on the recording medium only the first recording image signal for one frame formed by the recording image signal forming means.

The above and other objects, features and advantages of the present invention will become apparent from the following detailed description of embodiments of the present invention, taken in conjunction with the accompanying drawings.

BRIEF DESCRIPTION OF THE DRAWINGS

FIGS. 1, 1(A) and 1(B) are block diagrams showing the construction of the recording part of an electronic still video camera to which one embodiment of the present invention is applied;

FIGS. 4(A), 4(B), 4(C) and 4(D) are schematic views, each of which serves to illustrate the arrangement of chrominance signals in the high-fineness recording mode;

FIGS. 5, 5(A) and 5(B) are block diagrams showing the construction of the reproducing part of the electronic still video camera to which the above embodiment of the present invention is applied.

DETAILED DESCRIPTION OF THE PREFERRED EMBODIMENTS

Preferred embodiments of the present invention will be described below with reference to the accompanying drawings.

Figure 1A:
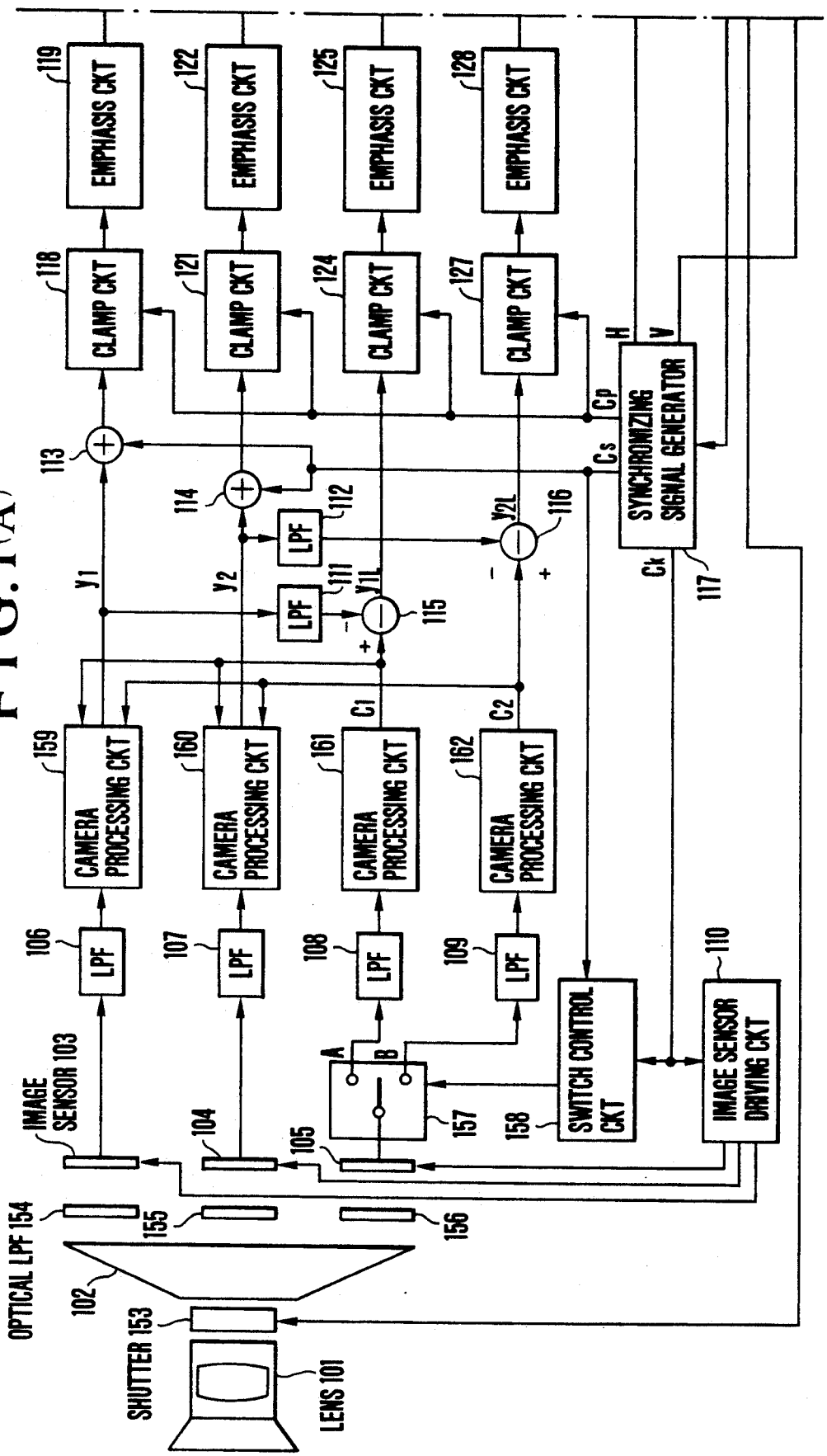

FIGS. 1, 1(A) and 1(B) are block diagrams which diagrammatically show the construction of the recording part of an electronic still video camera system to which one embodiment of the present invention is applied.

The following is a description of the recording operation of the recording part of the electronic still video camera system shown in FIGS. 1, 1(A) and 1(B).

Referring to FIGS. 1, 1(A) and 1(B), when a system controller 151 receives an instruction to initiate a recording operation from an operation part 152, incident light representing an image of an object (not shown) is fed into a prism 102 through an optical lens 101 and a shutter 153 whose operation is controlled by the system controller 151. The prism 102 splits the incident light into three light rays which are propagated in different directions. The three split light rays are respectively fed to the imaging planes of solid-state image sensors 103, 104, and 105 through corresponding optical low-pass filters (LPF's) 154, 155, and 156. Thus, images of the same object are formed on the imaging planes of the respective solid-state image sensors 103, 104, and 105. Each of the solid-state image sensors 103, 104, and 105 has approximately 600 picture elements in the horizontal direction and approximately 500 picture elements in the vertical direction.

As compared with the position of the imaging planes of the solid-state image sensor 103, the position of the imaging plane of the solid-state image sensor 104 is shifted by a half picture element in each of the horizontal and vertical directions with respect to the image obtained by imaging the object. The imaging plane of the solid-state image sensor 105 and the imaging plane of the solid-state image sensor 103 are positioned at the same location with respect to the image obtained by imaging the object.

A green filter (not shown) is provided on the imaging plane of each of the solid-state image sensors 103 and 104. When the system controller 151 receives an instruction to initiate a recording operation from the operation part 152, the system controller 151 transmits to a synchronizing signal generator 117 an instruction to initiate the recording operation. The synchronizing signal generator 117 in turn supplies a clock signal Ck to an image sensor driving circuit 110 and a switch control circuit 158. The image sensor driving circuit 110 drives the solid-state image sensors 103, 104, and 105 in synchronization with the received clock signal Ck. The switch control circuit 158 controls the switching operation of a switch 157.

As described above, the solid-state image sensor 103 driven by the image sensor driving circuit 110 outputs a green-component video signal (hereinafter referred to as the "$G_1$ signal"). This $G_1$ signal is band-limited by a low-pass filter (LPF) 106 and then supplied to a camera processing circuit 159, where it is subjected to predetermined processings such as gamma correction. Then, the camera processing circuit 159 adds, in an appropriate ratio, the $G_1$ signal to a red-component video signal (hereinafter referred to as the "R signal") and a blue-component video signal (hereinafter referred to as the "B signal"), both of which are provided by the solid-state image sensor 105 in a manner which will be described later. Thus, the camera processing circuit 159 forms and outputs a luminance signal $Y_1$.

The solid-state image sensor 104 outputs a green-component video signal (hereinafter referred to as the "$G_2$ signal"). In a manner similar to that used in forming the $G_1$ signal output from the solid-state image sensor 103, the $G_2$ signal is output as a luminance signal $Y_2$ through a low-pass filter (LPF) 107 and a camera processing circuit 160.

As described above, the luminance signal $Y_1$ and the luminance signal $Y_2$ formed by the respective camera processing circuits 159 and 160 are applied to corresponding addition circuits 113 and 114. In the addition circuit 113, the luminance signal $Y_1$ is multiplexed with a composite synchronizing signal Cs which is composed of horizontal and vertical synchronizing signals and generated by the synchronizing signal generator 117, while in the addition circuit 114, the luminance signal $Y_2$ is multiplexed with such a composite synchronizing signal Cs. Thereafter, the signals output from the respective addition circuits 113 and 114 are subjected to known clamping in corresponding clamp circuits 118 and 121 in synchronization with a clamp pulse Cp output from the synchronizing signal generator 117.

After the composite synchronizing signals Cs have been added as described above and the clamping has been effected, the luminance signal $Y_1$ is converted into a frequency-modulated luminance signal which conforms to a known format of electronic still video cameras through an emphasis circuit 119 and a frequency modulation circuit 120, while the luminance signal $Y_2$ is converted into a frequency-modulated luminance signal which conforms to the known format through an emphasis circuit 122 and a frequency modulation circuit 123. These frequency-modulated luminance signals are supplied to corresponding adders 130 and 131.

Figure 2:
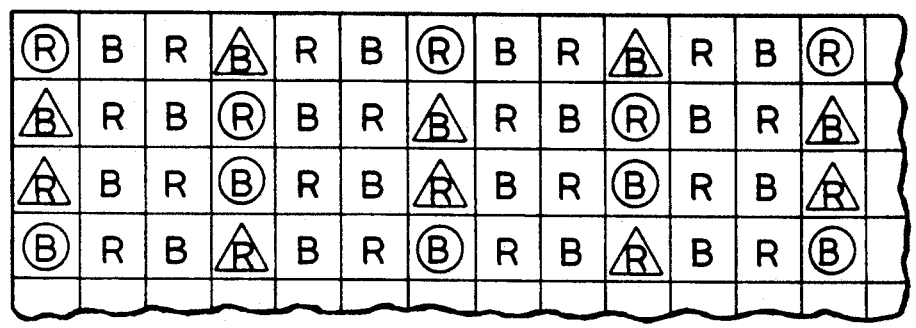
FIG. 2 is a diagrammatic view showing the construction of a color filter provided on the imaging plane of a solid-state image sensor used in the recording part of the electronic still video camera shown in FIGS. 1, 1(A) and 1(B)

The imaging plane of the solid-state image sensor 105 is provided with an R·B color filter having the construction shown in FIG. 2. R signals and B signals are sequentially output in the order determined by the R·B color filter from the solid-state image sensor 105 driven by the image sensor driving circuit 110. The R and B signals are in turn supplied to the switch 157 whose switching operation is controlled by the switch control circuit 158. The R and B signals are then selectively applied to, and output from, the output terminal A or B of the switch 157. The R·B color filter shown in FIG. 2 is disposed in such a manner that the meshes thereof correspond to the picture elements of the solid-state image sensor 105, and red filter elements (represented by R in FIG. 2) and blue filter elements (represented by B in FIG. 2) are arranged in the illustrated manner. The switch control circuit 158 is supplied with the clock signal Ck and the composite synchronizing signal Cs by the synchronizing signal generator 117. In synchronization with these signals, the switch control circuit 158 controls the switching operation of the switch 157 so that signals corresponding to the picture elements at positions represented by "○" in FIG. 2 (hereinafter referred to as the "$C_1$ signal(s)") are sequentially provided at the output terminal A of the switch 157, while signals corresponding to the picture elements at positions represented by "△" in FIG. 2 (hereinafter referred to as the "$C_2$ signal(s)") are sequentially provided at the output terminal B of the switch 157.

The $C_1$ signal and the $C_2$ signal which have been output from the switch 157 are band-limited by low-pass filters 108 and 109, respectively, and are then subjected to a predetermined processing such as gamma correction in corresponding camera processing circuits 161 and 162. The signals output from the camera processing circuits 161 and 162 are supplied to each of the camera processing circuits 159 and 160 which serve to form the luminance signal $Y_1$ and the luminance signal $Y_2$ as described above, respectively. Moreover, the signals output from the camera processing circuits 161 and 162 are supplied to subtracters 115 and 116, respectively.

In the meantime, the luminance signal $Y_1$ output from the camera processing circuit 159, which is band-limited by a low-pass filter (LPF) 111, is supplied to the subtracter 115, while the luminance signal $Y_2$ output from the camera processing circuit 160, which is band-limited by a low-pass filter (LPF) 112, is supplied to the subtracter 116. The subtracter 115 subtracts the luminance signal $Y_1$ from the $C_1$ signal to output a color-difference line-sequential signal $D_1$ which corresponds to the $C_1$ signal, while the subtracter 116 subtracts the luminance signal $Y_2$ from the $C_2$ signal to output a color-difference line-sequential signal $D_2$ which corresponds to the $C_2$ signal.

The color-difference line-sequential signal $D_1$ and the color-difference line-sequential signal $D_2$ are then supplied to clamp circuits 124 and 127, respectively. The color-difference line-sequential signal $D_1$ corresponds to the luminance signal $Y_1$ formed on the basis of the $G_1$ signal output from the solid-state image sensor 103, while the color-difference line-sequential signal $D_2$ corresponds to the luminance signal $Y_2$ formed on the basis of the $G_2$ signal output from the solid-state image sensor 104.

The color-difference line-sequential signals $D_1$ and $D_2$ output from the respective subtracters 115 and 116 are subjected to known clamping in the corresponding clamp circuits 124 and 127 in accordance with the clamp pulse Cp output from the synchronizing signal generator 117. The output from the clamp circuit 24 is converted into a frequency-modulated color-difference line-sequential signal which conforms to the known format of electronic still video cameras by an emphasis circuit 125 and a frequency modulation circuit 126, while the output from the clamp circuit 127 is converted into a frequency-modulated color-difference line-sequential signal which conforms to such a known format by an emphasis circuit 128 and a frequency modulation circuit 129. These frequency-modulated color-difference line-sequential signals are supplied to corresponding adders 130 and 131.

An index signal (hereinafter referred to as the "ID signal") corresponding to the information which has been set in the system controller 151 through the operation part 152 prior to the recording operation, for example, a recording date or recording time is generated by an ID signal generator 132 during at least one intermediate period of the time interval equivalent to the vertical blanking period of a video signal in synchronization with a signal $13f_H$ which has a frequency thirteen times the frequency of a horizontal synchronizing signal H supplied from the synchronizing signal generator 117. The ID signal thus generated is supplied to the adders 130 and 131.

As described above, the frequency-modulated luminance signal $Y_1$, the frequency-modulated color-difference line-sequential signal $D_1$, and the ID signal are supplied to the adder 130. The adder 130 frequency-multiplexes the received signals of the three kinds to output a recording video signal for one frame which conforms to the known format of electronic still video cameras, and then supplies the recording video signal to a field change-over switch 133. In the meantime, the frequency-modulated luminance signal $Y_2$, the frequency-modulated color-difference line-sequential signal $D_2$, and the ID signal are supplied to the adder 131. The adder 131 frequency-multiplexes the received signals of the three kinds to output a recording video signal for one frame which conforms to the known format of electronic still video cameras, and then supplies the one-frame recording video signal to a field change-over switch 134 through a mode change-over switch 164.

A magnetic disc 150 is rotated by the driving of a motor 146 before the system controller 151 receives the instruction to initiate the recording operation from the operation part 152. The motor 146 is controlled by a motor control circuit 148 so that the motor 146 can rotate in a predetermined phase with respect to a vertical synchronizing signal V output from the synchronizing signal generator 117. More specifically, a PG detector 147 is arranged to detect the position of a PG pin (not shown) provided on the magnetic disc 150, and each time the PG detector 147 detects the passage of the PG pin, a PG pulse generator 149 generates a PG detection pulse. The PG detection pulse thus generated and the vertical synchronizing signal V generated by the synchronizing signal generator 117 are supplied to the motor control circuit 148, thereby controlling the motor 146 so that the PG detection pulse and the vertical synchronizing signal V bear a predetermined phase relationship. Thus, the magnetic disc 150 is rotated in synchronization with the vertical synchronizing signal V.

The PG detection pulse output from the PG pulse generator 149 is also supplied to the system controller 151. In synchronization with the PG detection pulse, the system controller 151 switches each of the field change-over switches 133 and 134 between opposite sides represented by A and B in FIG. 1(B) so that the recording video signal output from the adder 130 is switched at intervals of one field and is alternately supplied to recording amplifiers 135 and 136, while the recording video signal output from the adder 131 is switched at intervals of one field and is alternately supplied to recording amplifiers 137 and 138. The recording signals amplified by the respective recording amplifiers 135, 136, 137 and 138 are supplied to corresponding magnetic heads 141, 142, 143 and 144 which are aligned over the magnetic disc 150 in the radial direction thereof. Thus, the recording signals are recorded on the magnetic disc 150. The magnetic heads 141 to 144 are capable of moving over the magnetic disc 150 in the radial direction thereof by the driving of a head moving mechanism 145. By operating the operation part 152, a movement instruction signal is supplied from the system controller 151 to the head moving mechanism 145, thereby causing the magnetic heads 141 to 144 to move to arbitrary positions on the magnetic disc 150, respectively.

The mode change-over switch 160 is arranged to be switched on and off through the system controller 151 in response to an instruction supplied from the operation part 152. In the recording apparatus according to the above embodiment, the mode change-over switch 164 is provided with two kinds of recording modes; one is a normal recording mode in which a video signal for one frame obtained through the solid-state image sensors 103 and 105 is recorded on two tracks of the magnetic disc 150 by means of the recording heads 141 and 142 and the other is a high-fineness recording mode in which a video signal for one frame obtained through the solid-state image sensors 103, 104 and 105 is recorded on four tracks of the magnetic disc 150 by means of the recording heads 141, 142, 143 and 144. Which of two such recording modes should be selected to effect recording of video signals is determined by operating the operation part 152. More specifically, if the high-fineness recording mode is selected by the operation part 152, the system controller 151 switches on the mode change-over switch 164 to supply the recording video signal output from the adder 131 to the field change-over switch 134, thereby effecting recording to four concentric recording tracks which are contiguously formed on the magnetic disc 150. On the other hand, if the normal recording mode is selected, the system controller 151 switches off the mode change-over switch 164 to cut off the supply of the recording video signal output from the adder 131 to the field change-over switch 134, thereby effecting recording on two concentric recording tracks which are contiguously formed on the magnetic disc 150.

Figure 3A:
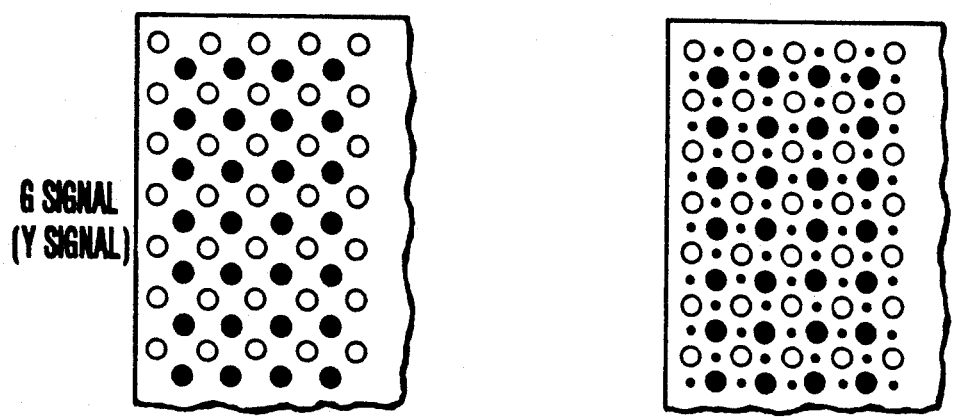
FIGS. 3(A), 3(B) and 3(C) are diagrammatic views each of which serves to illustrate the relationship between the arrangement of picture elements which correspond to a video signal recorded on a magnetic disc in a high-fineness recording mode in the electronic still vide camera system according to the embodiment and the arrangement of picture elements which are interpolated during reproduction.
Figure 3B:
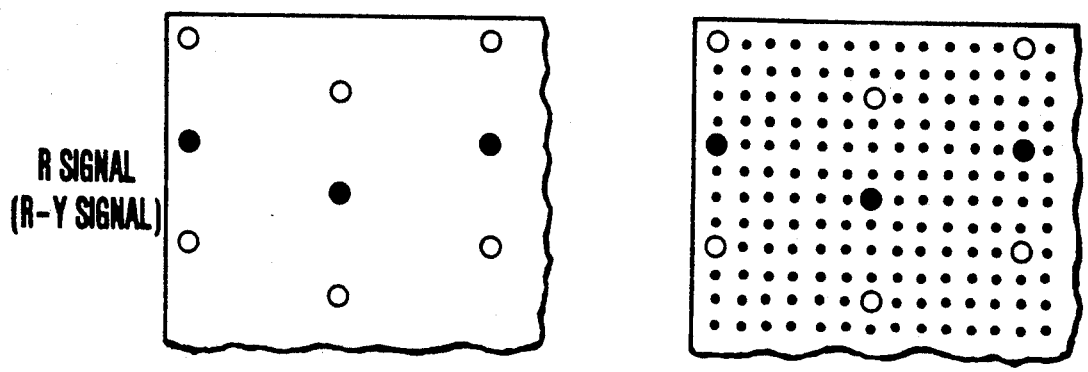
Figure 3C:
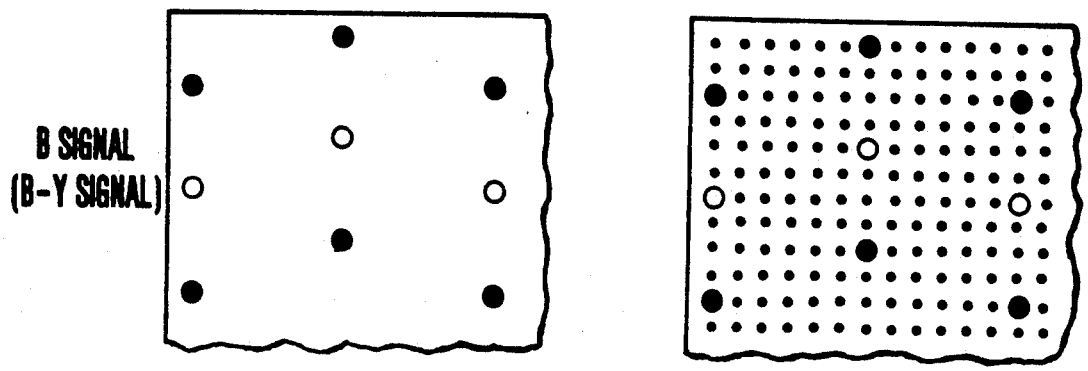

FIGS. 3(A), 3(B) and 3(C) show the relationships between the arrangement of picture elements which correspond to a video signal recorded on the magnetic disc 150 in the high-fineness recording mode in the above embodiment of the electronic still video camera system and the arrangement of picture elements which are interpolated during reproduction. FIG. 3(A) shows G signals (or luminance signals $Y_1$ and $Y_2$), where the $G_1$ and $G_2$ signals are represented by "O" and "●", respectively. FIG. 3(B) shows a signal (or color-difference signals R-Y), where $R_1$ and $R_2$ signals are represented by "O" and "●", respectively. FIG. 3(C) shows B signals (or color-difference signals B-Y), where B1 and B2 signals are represented by "O" and "●", respectively.

As shown in FIGS. 3(A), 3(B) and 3(C), in a video signal recorded on the magnetic disc, the number of picture elements corresponding to the color-difference signals R-Y and B-Y is small compared to the number of picture elements corresponding to the luminance signal Y. This is because, according to the format of electronic still video cameras, the band allocated for the chrominance signal is narrow compared to the band of the luminance signal and the chrominance signal does not require so high resolution as the luminance signal.

FIG. 4(A) shows the positional relationship, on a high-fineness picture, between the R signals (or color-difference signals B-Y) and the B signals (or color-difference signals B-Y) in an image signal which is recorded on the magnetic disc 150 in the high-fineness recording mode in the above-described manner.

In other words, since the scanning lines of a second frame are disposed so that the scanning lines of a first frame and the second frame are interleaved with each other, resolution in the vertical direction is improved. Moreover, since the arrangement of picture elements is offset in a line-by-line fashion, resolution in the horizontal direction is also improved. Accordingly, a high-fineness image is obtained. In this case, if the chrominance signal do not have a certain degree of resolution in the horizontal or vertical direction, it would be impossible to obtain a high-fineness image. However, in the above embodiment, since color-difference line-sequential recording as shown in FIG. 4(A) is effected by utilizing an R·B filter such as that shown in FIG. 2, it is possible to increase the resolutions of the chrominance signal in the horizontal and vertical directions while maintaining the balance therebetween.

Figure 6:
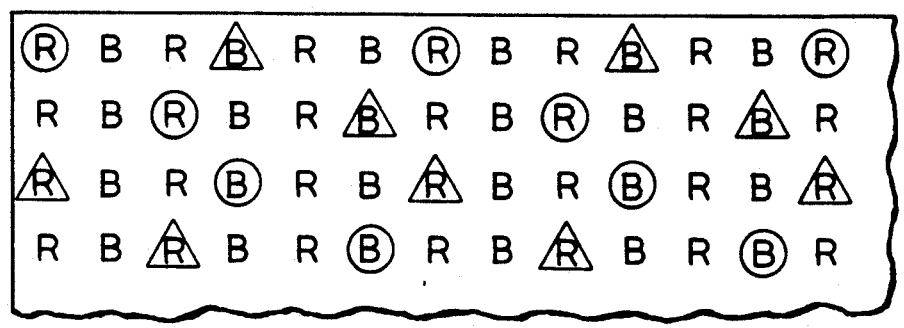
FIG. 6 is a schematic view showing the construction of a color filter used in another embodiment.

FIGS. 4(B), 4(C) and 4(D) show other combinations of color-difference line sequential signals recorded on the magnetic disc 150. In the case of the combinations shown in FIGS. 4(C) and 4(D), the resolution of the chrominance signal in the vertical direction is, as illustrated, low compared to the resolution of the chrominance signal of FIG. 4(A) in the vertical direction, so that a high-fineness image is not obtained. However, the combination of FIG. 4(B) can achieve a resolution equivalent to the resolution realized by the combination of FIG. 4(A). In order to realize the arrangement of the chrominance signal as shown in FIG. 4(B), an R·B filter having a construction such as that shown in FIG. 6 may be employed.

In the above embodiment, the color-difference signals R-Y and B-Y which have the arrangements of picture elements shown in FIGS. 3(B) and 3(C), respectively, are formed by the above-described method. However, the signal provided by the solid-state image sensor 105 provided with the R·B color filter shown in FIG. 2 is derived from the image which is formed on the imaging plane of the solid-state image sensor 105 through the optical low-pass filter (LPF) 156. Accordingly, the chrominance signal recorded on the magnetic disc 150 does not undergo any deterioration due to the aliasing of the signal.

In order that a fluctuation which occurs in the time axis of a video signal during reproduction thereof may be eliminated in a reproducing part which will be described later, the recording part of the electronic still video camera according to the above embodiment is arranged to record, on the magnetic disc 150, a recording video signal and the signal $13f_H$ output from the ID signal generator 132 in synchronization with the horizontal synchronizing signal H output from the synchronizing signal generator 117, the signal $13f_H$ serving as a reference signal for elimination of the fluctuation in the time axis.

The ID signal output from the ID signal generator 132 is generated during at least one intermediate period of the time interval equivalent to the vertical blanking period of a video signal in synchronization with the signal $13f_H$. During the rest of that time interval, the ID signal is generated so that the position of a zero-crossing of the signal $13f_H$ can coincide with the rising position of the horizontal synchronizing signal H output from the synchronizing signal generator 117.

Figure 5B:
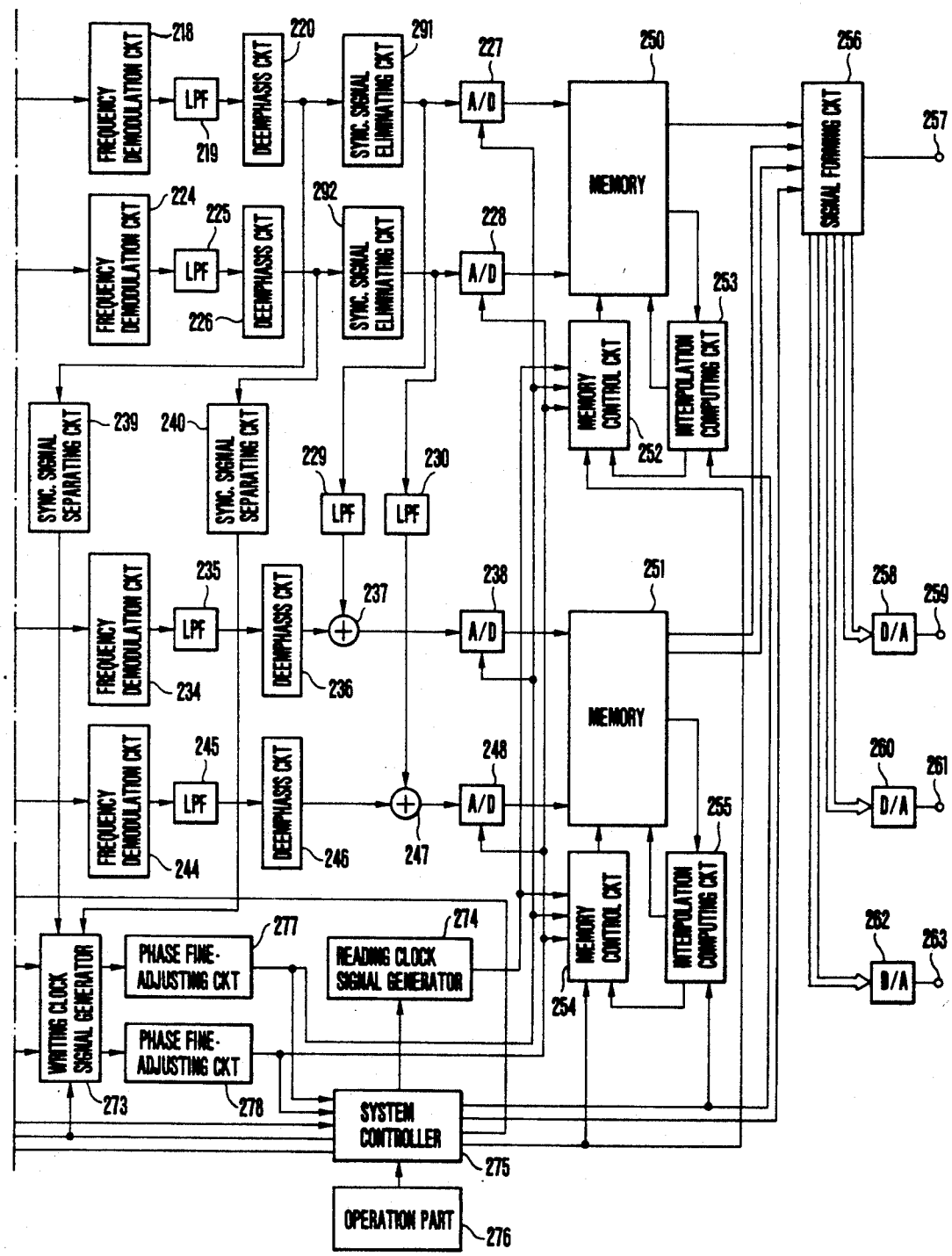

FIGS. 5, 5(A) and 5(B) are block diagrams which diagrammatically show the construction of the reproducing part of the electronic still video camera system according to the particular embodiment.

The following is a description of the reproducing operation of the reproducing part of the electronic still video camera system shown in FIGS. 5, 5(A) and 5(B). The reproducing part of the electronic still video camera system according to the above embodiment is arranged so that is can reproduce both a video signal which was recorded in the normal recording mode in the recording part shown in FIGS. 1, 1(A) and 1(B) and the video signal which was recorded in the high-fineness recording mode in the same recording part. For the purpose of illustration, the following description is made with reference to the operation of reproducing a video signal which is recorded on the magnetic disc on the basis of the high-fineness recording mode.

Referring to FIGS. 5, 5(A) and 5(B), when initiation of a reproducing operation and a track number to be reproduced are specified through an operation part 276, a system controller 275 transmits a corresponding instruction to a head moving mechanism 285 to cause magnetic heads 201, 202, 203 and 204 to move to the recording track of a magnetic disc 208 which has been specified through the operation part 276.

In the meantime, when the instruction to initiate the reproducing operation is given through the operation part 276, a motor control circuit 282 is actuated in accordance with the instruction of the system controller 275 to control a motor 281 provided for rotating the magnetic disc 286 so that the motor 281 can run in a predetermined phase with respect to a vertical synchronizing signal V supplied from the system controller 275. More specifically, a PG detector 283 is arranged to detect the position of a PG pin (not shown) provided on the magnetic disc 286, and each time the PG detector 283 detects the passage of the PG pin, a PG pulse generator 284 generates a PG detection pulse. The PG detection pulse thus generated and the vertical synchronizing signal V generated by the system controller 275 are supplied to the motor control circuit 282, thereby controlling the motor 281 so that the PG detection pulse and the vertical synchronizing signal V bear a predetermined phase relationship. Thus, the magnetic disc 286 is rotated in synchronization with the vertical synchronizing signal V.

As described above, magnetic heads 201, 202, 203 and 204 are moved to arbitrary contiguous recording tracks formed on the magnetic disc 286, and when the rotation of the magnetic disc 286 by the motor 281 becomes stable, the recorded signals are produced from the magnetic disc 286 through the magnetic heads 201, 202, 203 and 204. The signals reproduced by the magnetic heads 201, 202, 203 and 204 are amplified by corresponding transformers 205, 206, 207 and 208, respectively, and are further amplified by corresponding pre-amplifiers 209, 210, 211 and 212. The reproduced signal amplified by the pre-amplifiers 209 and 210 are supplied to a field change-over switch 213, while the reproduced signals amplified by the pre-amplifiers 211 and 212 are supplied to a field change-over switch 214.

The switching operations of the respective field change-over switches 213 and 214 are controlled by the system controller 275. The system controller 275 receives a PG detection pulse output from the PG pulse generator 284. In synchronization with the PG detection pulse, the system controller 275 switches each of the field change-over switches 213 and 214 between sides A and B in FIG. 5(A) so that the reproduced signals picked up by the magnetic heads 201 and 203 are first output at the same time and the reproduced signals picked up by the magnetic heads 202 and 204 are then output at the same time.

The signal output from the field change-over witch 213 is supplied to a high-pass FILTER (HPF) 215 and band-pass filters (BPF's) and 271, while the signal output from the field change-over switch 214 is supplied to a high-pass filter (HPF) 221 and band-pass filters 241 and 272.

The high-pass filter 215 extracts a frequency-modulated luminance signal from the reproduced signal supplied from the field change-over switch 213. The high-pass filter 221 likewise extracts a frequency-modulated luminance signal from the reproduced signal supplied from the field change-over switch 214. The frequency-modulated luminance signals thus extracted are supplied to corresponding equalizer circuits 216 and 222, where the frequency characteristics of the respective signals are corrected. The outputs of the respective equalizer circuits 216 and 222 are supplied to corresponding limiter circuits 217 and 223, where they are respectively suppressed to predetermined levels for the purpose of prevention of inversion. Then, the outputs of the respective limiter circuits 217 and 223 are applied to corresponding frequency demodulation circuits 218 and 224 for the purpose of frequency-demodulation. The frequency-demodulated signals are applied to corresponding low-pass filters 219 and 225, where extra frequency components are eliminated from the respective signals. The outputs of the low-pass filter's (LPF's) 219 and 225 are applied to corresponding deemphasis circuits 220 and 226, where the respective signals are subjected to a processing reverse to emphasis which was effected during recording. Thus, each of the low-pass filters (LPF's) 219 and 225 outputs a luminance signal which contains a synchronizing signal.

The band-pass filter (BPF) 231 extracts a frequency-modulated color-difference line-sequential signal from the reproduced signal supplied from the field change-over switch 213. The band-pass filter (BPF) 241 likewise extracts a frequency-modulated color-difference line-sequential signal from the reproduced signal supplied from the field change-over switch 214. As in the case of the aforesaid luminance signal, the frequency-modulated color-difference line-sequential signal extracted by the synchronizing signal eliminating circuit 291 is applied to an analog-digital (A/D) converter 227 and a low-pass filter (LPF) 229 for the purpose of eliminating extra frequency components. The output of the low-pass filter (LPF) 229 is supplied to an adder 237. Similarly, the luminance signal which contains the synchronizing signal and which has been output from the deemphasis circuit 226 is supplied to a synchronizing signal eliminating circuit 292 for the purpose of eliminating the synchronizing signal. The output of the synchronizing signal eliminating circuit 292 is applied to an analog/digital (A/D) converter 228 and a low-pass filter (LPF) 230 for the purpose of eliminating extra frequency components. The output of the low-pass filter (LPF) 230 is supplied to an adder 247. In the adder 237, the output of the low-pass filter (LPF) 229 is added to the color-difference line-sequential signal output from a deemphasis circuit 236, while in the adder 247, the output of the low-pass filter (LPF) 230 is added to the color-difference line-sequential signal output from a deemphasis circuit 246. Thus, the adders 237 and 247 sequentially supply R and B signals to A/D converters 238 and 248, respectively. It is to be noted that, in the aforesaid addition of the luminance signal to the color-difference line-sequential signal, the time axes of the luminance signal and the color-difference line-sequential signal are made coincident with each other by a delay circuit (not shown) so that each luminance signal can be added to a corresponding color-difference line-sequential signal.

The band-pass filters (BPF's) 271 and 272 extract the signals $13f_H$ from the reproduced signals supplied from the corresponding field change-over switches 213 and 214, and then supply the signals $13f_H$ to a writing clock signal generator 273. Moreover, the luminance signal which contains the synchronizing signal and which has been output from the deemphasis circuit 220 is applied to a synchronizing signal separating circuit 239, while the iuminance signal which contains the synchronizing signal and which has been output from the deemphasis circuit 226 is applied to a synchronizing signal separating circuit 240. The synchronizing signals which have been obtained by separation in the respective synchronizing signal separating circuits 239 and 240 are supplied to the writing clock signal generator 273. The writing clock signal generator 273 employs these signals to from writing clock signals to be applied to the aforesaid A/D converters 227, 228, 238 and 248.

The following is a description of the operation of the writing clock signal generator 273.

In general, fluctuations occur in the time axes of the signal reproduced from a recording track on the magnetic disc 286 by the magnetic head 201 or 202 and the signal reproduced from a recording track on the magnetic disc 286 by the magnetic head 203 or 204. Accordingly, since the signals $13f_H$ are separated from the reproduced signals in the respective band-pass filters (BPF's) 271 and 272, the individual signals $13f_H$ contain fluctuations in the time axes which are the same as the fluctuations in the time axes of the corresponding reproduced signals.

In order to enable each of the A/D converters 227, 228, 238 and 248 to effect A/D conversion which follows the aforesaid time-axis fluctuations, a PLL (phase-locked loop) circuit disposed in the writing clock signal generator 273 is arranged to form writing clock signals which are phase-synchronized with the signals $13f_H$ obtained by separation in the band-pass filters (BPF's) 271 and 272, respectively.

In the case of forming the writing clock signal in the writing clock signal generator 273, a video signal is, as described above, recorded so that the rising position of the horizontal synchronizing signal of the video signal coincides with the position of the zero-crossing of the signal $13f_H$. Accordingly, the phases of the signals $13f_H$ supplied from the respective band-pass filters (BPF's) 271 and 272 are controlled so that the rising positions of the horizontal synchronizing signals which are separated by and supplied from the respective synchronizing signal separating circuits 239 and 240 are coincident with the zero-crossings of the signals $13f_H$ which are separated by and supplied from the respective band-pass filters 271 and 272. The PLL circuit in the writing clock signal generator 273 forms the writing clock signals in accordance with the phases of the signals $13f_H$ which have been thus controlled.

The writing clock signals thus formed are supplied to phase fine-adjusting circuits 277 and 278, respectively. The phase fine-adjusting circuits 277 and 278 enable the phases of the supplied writing clock signals to be finely adjusted by operating the operation part 276. The operator operates the operation part 276 while checking an image which is reproduced on a monitor (not shown) by the reproducing apparatus according to the above embodiment, to make fine adjustment of the phases of the writing clock signals through the respective phase fine-adjusting circuits 277 and 278, thereby optimizing the phases of the writing clock signals.

The writing clock signal output from the phase fine-adjusting circuit 277 is supplied to the A/D converters 227 and 238, while the writing clock signal output from the phase fine-adjusting circuit 278 is supplied to the A/D converters 228 and 248. On the basis of the supplied writing clock signals, the A/D converters 227 and 228 effect A/D conversion of the supplied luminance signals, and the A/D converters 238 and 248 effect A/D conversion of the supplied R and 228 signals, respectively. The digital luminance signals output from the respective A/D converters 227 and 228 are supplied to a memory 250, and the digital R and B signals output from the respective A/D converters 238 and 248 are supplied to a memory 251. Memory control circuits 252 and 254, which are set to their writing control states in accordance with the instruction of the system controller 275, are caused to operate on the basis of the writing clock signals output from the phase fine-adjusting circuits 277 and 278. Thus, the memory control circuits 252 and 254 specify particular write addresses in the memories 250 and 251, respectively, thereby allowing the supplied signals to be stored in the respective memories 250 and 251.

In this manner, the memory 250 stores the digital luminance signals for two frames which have been obtained from the signals reproduced from the four recording tracks on the magnetic disc 286, while the memory 251 stores the R and B signals for two frames. The system controller 275 counts the writing clock signals output from the respective phase fine-adjusting circuits 277 and 278, and if the system controller 275 detects the fact that the storage operations of the memories 250 and 251 have been completed, the system controller 275 sets the memory control circuits 252 and 254 to their reading control states and further instructs interpolation computing circuits 253 and 255 to start an interpolation processing.

The following is a description of the interpolation processing effected in the apparatus according to the above embodiment. In the right-hand view of FIG. 3(A), the marks "O" and "●" represent the positions on the picture, of picture elements which correspond to the digital liminance signal stored in the memory 250. In the right-hand view of FIG. 3(B), the marks "O" and "●" represent the positions, on the picture, of picture elements which correspond to the digital R signal stored in the memory 251, and in the right-hand view of FIG. 3(C), the marks "O" and "●" represent the positions, on the picture, of picture elements which correspond to the digital B signal stored in the memory 251.

The interpolation processing in the above embodiment is effected by means of an interpolating filter arranged to interpolate data placed at the positions indicated by the marks "·" in FIGS. 3(A), 3(B) and 3(C) by using the data, indicated by the marks "O" and "●", located around the marks "·". The interpolating filter is constructed utilizing the values of the picture-element data "O" and "●" which is located around each data "·". The interpolation computing circuits 253 and 255 instruct the corresponding memory control circuits 252 and 254 to read from the respective memories 250 and 251 the picture-element data required to effect the interpolation processing using the aforesaid interpolating filter to write the readout data into the corresponding interpolation computing circuits 253 and 255. The memory control circuits 252 and 254 control the readout addresses of the corresponding memories 250 and 251 in accordance with the instructions of the respective interpolation computing circuits 253 and 255, thereby writing the required picture-element data into the interpolation computing circuits 253 and 255. Each of the interpolation computing circuits 253 and 255 employs the written picture element data to form interpolated picture element data corresponding to the data indicated by the marks "·" in FIGS. 3(A), 3(B) and 3(C). The interpolation computing circuits 253 and 255 supply the interpolated picture element data to the corresponding memories 250 and 251.

In the meantime, the memory control circuits 252 and 254 supply writing addresses to the respective memories 250 and 251 in order to cause the memories 250 and 251 to store the supplied interpolated picture element data. Thus, the interpolated picture element data is stored at the specified addresses in the memories 250 and 251.

By effecting such an interpolation processing in the above-described manner, picture element data equivalent to approximately 1,200×1,000 picture elements per picture is retained in the memories 250 and 251.

Incidentally, when chrominance signals are compared with luminance signals, the chrominance signals are less than the luminance signals in respect of the amount of information recorded on the magnetic disc 286. Therefore, since the amount of interpolated picture element data formed by the interpolation processing are increased, it may be impossible to enhance the resolution of the chrominance signals. However, such impossibility is not a problem since no deterioration of the image quality conspicuously appears by virtue of the visual characteristics of human beings.

As described above, after the interpolation processing on the memories 250 and 251 has been completed, the system controller 275 instructs a reading clock signal generator 274 to supply reading clock signal signals to the memory control circuits 252 and 254. In synchronization with the supplied reading clock signal, the memory control circuit 252 reads the digital luminance signal retained in the memory 250 with the memory control circuit 254 reading the R and B signals retained in the memory 251. These readout signals are supplied to a signal forming circuit 256.

The signal forming circuit 256 consists of a matrix circuit, a synchronizing signal adding circuit and so forth, and is arranged to form various forms of video signals by employing the supplied digital luminance signals and the supplied R and B signals and then to output the video signals after adding synchronizing signals thereto. In the above embodiment, the signal forming circuit 256 is provided with a digital output terminal 257 provided for outputting a digital video signal to a printer or a personal computer, a high-definition signal output terminal 259 provided for outputting an analog video signal which conforms to high-definition television standards, an RGB terminal 261 provided for outputting analog RGB signals, and an NTSC output terminal 263 provided for outputting an analog video signal which conforms to NTSC standards. The operator selects the desired output form of video signal through the operation part 276, and in response to the output form of the video signal selected by the operator, the system controller 275 gives an instruction signal to the signal forming circuit 256. In response to the instruction signal, the signal forming circuit 256 converts the supplied digital luminance signal, R signal, and G signal into the selected output form of the video signal and, at the same time, adds a synchronizing signal thereto, thereby outputting the obtained digital signal through the digital output terminal 256. If the video signal is to be output in an arbitrary analog form, the digital signal is converted into an analog signal through any of digital/analog (D/A) converters 258, 260 and 262 and then provided at the corresponding output 259, 261 or 263.

The foregoing is a description of the operation of the reproducing part of the electronic still video camera system shown in FIGS. 5, 5(A) and 5(B) in the case of reproducing the video signals which were recorded on the magnetic disc in the high-fineness recording mode by the recording part shown in FIGS. 1, 1(A) and 1(B). When video signals recorded on the magnetic disc in the normal recording mode by the aforesaid recording system is to be reproduced by the recording part, all that is required is to operate the circuits for effecting processing of the reproduced signals provided by the magnetic heads 201 and 202 shown in FIG. 5(A). This operation is substantially equivalent to the operation executed to reproduce the video signals recorded in the aforesaid high-fineness recording mode, and any detailed description is therefore omitted. The video signals recorded in the normal recording mode during recording are output after they have been subjected to a known type of appropriate interpolation processing.

The signal forming circuit 256 is arranged so as not to form any analog signal that conforms to high-definition television standards, and no analog video signal is provided at the high-definition signal output terminal 259.

In order to effect switching between the process of reproducing the video signals recorded in then normal recording mode and the process of reproducing the video signals recorded in the high-fineness recording mode, the operation part 276 may be operated to supply to the system controller 275 an instruction to execute a reproduction process corresponding to either of the two recording modes. However, instead of the above arrangement, a recording-mode identifying code may be set in the ID signal recorded together with the video signal during recording, and a circuit for identifying a recording mode may be provided in the reproducing part. In this arrangement, which of the recording modes was selected to record the reproduced signal may be automatically determined on the basis of the recording-mode identifying code contained in the ID signal added to the signal reproduced from the magnetic disc 286, and the result may be supplied to the system controller 275 for the purpose of selecting a corresponding reproduction processing.

As described above, in the format of the electronic still video camera according to the present embodiment, it is possible to record high-fineness video signals in a form which conforms to the format of electronic still video cameras and to reproduce the recorded high-fineness video signals. Moreover, it is possible to restore such high-fineness video signals without being influenced by a fluctuation in the time axis.

The above-described embodiment is explained with illustrative reference to the apparatus employing four magnetic heads, but the present invention is not limited solely to this arrangement. For example, the present invention is applicable to an apparatus of the type arranged to record or reproduce an image signal on or from a magnetic disc while sequentially moving two or one magnetic head during recording or reproduction. The construction of the imaging part is not limited solely to a three-CCD type arrangement utilizing three solid-state image sensors. For example, the present invention is applicable to a single-CCD type arrangement utilizing one solid-state image sensor or a two-CCD type arrangement utilizing two solid-state image sensors.

It will be appreciated from the foregoing that, in accordance with the present invention, it is possible to provide an image signal recording apparatus having compatibility with a conventional format and yet being capable of recording on a recording medium an image signal in which not only the quality of its luminance component but also the quality of its chrominance component is improved compared to the quality of the luminance and chrominance components of an image signal recorded by a conventional apparatus.

What is claimed is:

1. An image signal recording apparatus or recording on a recording medium an image signal obtained by sensing an object, comprising:
    (A) first image sensing means for sensing said object and generating a first sensed image signal;
    (B) second image sensing means arranged to sense the object and generate a second sensed image signal containing signal component which is the same in kind as signal component of said first sensed image signal, the arrangement of picture elements of said second image sensing means differing from the arrangement of picture elements of said first image sensing means in relation to the object;
    (C) third image sensing means arranged to sense the object and generate a third sensed image signal containing signal component which differs in kind from the signal component of said first and second sensed image signals;
    (D) recording image signal forming means for forming a first recording image signal including a luminance signal and a color-difference line-sequential signal in which two kinds of color-difference signals are in a first sequence in every one horizontal scanning period, by using said first sensed image signal and said third sensed image signal, and for forming a second recording image signal including a luminance signal and a color-difference line-sequential signal in which two kinds of color difference signals are in a second sequence different from said first sequence during at least a part of the period from the color-difference line-sequential signal included in said first recording image signal, by using said second sensed image signal and said third sensed image signal; and
    (E) recording means for recording said first recording image signal and said second recording image signal formed by said recording image signal forming means on separate areas on the recording medium, respectively.

2. An image signal recording apparatus according to claim 1, wherein said recording image signal forming means is so arranged that the first recording image signal for one frame period corresponds to the first recording image signal for two field periods and said second recording image signal for one frame period corresponds to the second recording image signal for two field periods.

3. An image signal recording apparatus according to claim 2, wherein said recording image signal forming means is so arranged that the color-difference line-sequential signal included in said first recording image signal and the color-difference line-sequential signal included in said second recording image signal are different in color-difference signal sequence during at least one field period.

4. An image signal recording apparatus according to claim 1, wherein said first image sensing means includes a first image sensor having a first number of picture elements and arranged to generate said first sensed image signal.

5. An image signal recording apparatus according to claim 4, wherein said second image sensing means includes a second image sensor whose picture elements are equal in number to the picture elements of said first image sensor and whose imaging plane is located at a position deviating from the position of an imaging plane of said first image sensor in the horizontal and vertical directions in relation to the object, said second image sensor being arranged to generate said second sensed image signal having signal component which is the same in kind as said first sensed image signal.

6. An image signal recording apparatus according to claim 1, wherein said first image sensing means includes a green filter capable of transmitting a green component of an image of the object, said first sensed image signal being an image signal corresponding to said green component of the image of the object.

7. An image signal recording apparatus according to claim 6, wherein said second image sensing means includes a green filter capable of transmitting a green component of the image of the object, said second sensed image signal being an image signal corresponding to said green component of the image of the object.

8. An image signal recording apparatus according to claim 7, wherein said third image sensing means includes a color separating filter capable of transmitting a blue component and a red component of the image of the object, said third sensed image signal being an image signal corresponding to said red component and said blue component of the image of the object.

9. An image signal recording apparatus for recording on a recording medium an image signal obtained by sensing an object, comprising:
(A) first image sensing means having a first image sensing part and a second image sensing part having picture elements whose arrangement differs from the arrangement of picture elements of said first image sensing part in relation to the object, said first image sensing means being arranged to sense the object and to generate a first sensed image signal from said first image sensing part and a second sensed image signal having signal component which is the same in kind as signal component of said first sensed image signal from said second image sensing part;
(B) second image sensing means arranged to sense the object and generate a third sensed image signal having signal component which differs in kind from the signal component of said first and second sensed image signals;
(C) recording image signal forming means for forming a first recording image signal including a luminance signal and a color-difference line-sequential signal in which two kinds of color-difference signals are in a first sequence in every one horizontal scanning period, by using said first sensed image signal and said third sensed image signal, and for forming a second recording image signal including a luminance signal and a color-difference line-sequential signal in which two kinds of color-difference signals are in a second sequence different from said first sequence during at least a part of the period from the color-difference line-sequential signal included in said first recording image signal, by using said second sensed image signal and said third sensed image signal; and
(D) recording means having a first recording mode in which the first recording image signal and the second recording image signal formed by said recording image signal forming means are recorded on separate areas on the recording medium for every one frame period, respectively, and a second recording mode in which only the first recording image signal formed by said recording image signal forming means is recording on the recording medium for every one frame period, for recording the image signal corresponding to said object on the recording medium, according to either one of said first recording mode or said second recording mode.

10. An image signal recording apparatus according to claim 9, wherein said recording image signal forming means is so arranged that the first recording image signal for one frame period corresponds to the first recording image signal for two field periods and said second recording image signal for one frame period corresponds to the second recording image signal for two field periods.

11. An image signal recording apparatus according to claim 10, wherein said recording image signal forming means is so arranged that the color-difference line-sequential signal included in said first recording-image signal and the color-difference line-sequential signal included in said second recording image signal are different in color-difference signal sequence during at least one field period.

12. An image signal recording apparatus according to claim 11, wherein said recording means is arranged to record, in said first recording mode, said first recording image signal for one frame period formed by said recording image signal forming means in two tracks on the recording medium, respectively, for every one field period and said second recording image signal for one frame period formed by said recording image signal forming means in two other tracks on the recording medium, respectively for every one field period, and to record, in said second recording mode, said first recording image signal for one frame formed by said recording image signal forming means in two tracks on the recording medium, respectively, for every one field period.

* * * * *

UNITED STATES PATENT AND TRADEMARK OFFICE
CERTIFICATE OF CORRECTION

PATENT NO. : 5,159,461

DATED : October 27, 1992

INVENTOR(S) : Ryo Fujimoto

It is certified that error appears in the above-identified patent and that said Letters Patent is hereby corrected as shown below:

On the title page, item [57], in the Abstract, line 21, change "th ethird" to -- the third --

Col. 1, line 28.   After "current" insert -- electronic still video cameras is not sufficient --

Col. 1, line 38.   Change "system" to -- systems --

Col. 3, line 48.   Change "vide" to -- video --

Col. 6, line 32.   Change "24" to -- 124 --

Col. 8, line 27.   Change "a signal" to -- R signals --

Col. 8, line 45.   Change "B-Y" to -- R-Y --

Col. 8, line 57.   Change "do" to -- does --

Col. 9, line 55.   Change "is" to -- it --

Col. 10, line 2.   Change "208" to -- 286 --

Col. 10, line 35.  Change "signal" to -- signals --

Col. 10, line 52.  Change "witch" to -- switch --

Col. 11, line 10.  Change "filter's" to -- filters --

Col. 11, line 26.  After "by" insert -- the band-pass filter (BPF) 231 passes through an equalizer circuit 232, a limiter circuit 233, a frequency demodulation circuit 234, a low-pass filter (LPF) 235, and a deemphasis circuit 236 so that the signal is restored to the original color-difference line-sequential signal. The frequency-modulated color-difference line-sequential signal extracted by the band-pass filter (BPF) 241 likewise passes through an equalizer circuit 242, a limiter circuit 243, a frequency demodulation

UNITED STATES PATENT AND TRADEMARK OFFICE
CERTIFICATE OF CORRECTION

PATENT NO. : 5,159,461
DATED : October 27, 1992
INVENTOR(S) : Ryo Fujimoto It is certified that error appears in the above-identified patent and that said Letters Patent is hereby corrected as shown below:

| | | |
|---|---|---|
| Col. 11, line 26. (continued) | | circuit 244, a low-pass filter (LPF) 245, and a deemphasis circuit 246 so that the signal is restored to the original color-difference line-sequential signal.   The luminance signal which contains the synchronizing signal and which has been output from the deemphasis circuit 220 is supplied to a synchronizing signal eliminating circuit 291 for the purpose of eliminating the synchronizing signal. The output of -- |
| Col. 12, line 4. | | Change "from" to -- form -- |
| Col. 12, line 64. | | Change "228" to -- B -- |
| Col. 13, line 30. | | Change "liminance" to -- luminance -- |
| Col. 16, line 4. | | Change "or" to -- for -- |

Signed and Sealed this

Second Day of November, 1993

Attest:

BRUCE LEHMAN

Attesting Officer    Commissioner of Patents and Trademarks